United States Patent [19]

Weber

[11] Patent Number: 5,288,548
[45] Date of Patent: Feb. 22, 1994

[54] LABEL FACE STOCK

[75] Inventor: Ralph J. Weber, Fairport, N.Y.

[73] Assignee: Mobil Oil Corporation, Fairfax, Va.

[21] Appl. No.: 922,418

[22] Filed: Jul. 31, 1992

[51] Int. Cl.⁵ .................. B32B 27/00; B32B 7/12; C08F 20/10
[52] U.S. Cl. .............. 428/315.9; 428/315.5; 428/315.7; 428/354; 525/222; 525/228; 525/330.3
[58] Field of Search .............. 428/354, 355, 315.7, 428/315.9, 315.5; 525/330.3, 222, 228

[56] References Cited

U.S. PATENT DOCUMENTS

| | | |
|---|---|---|
| 3,753,769 | 8/1973 | Steiner. |
| 3,845,163 | 10/1974 | Murch. |
| 4,377,616 | 3/1983 | Ashcraft et al. ........... 428/213 |
| 4,865,908 | 9/1989 | Liu et al. ........... 428/248 |
| 5,194,324 | 3/1993 | Poirier ........... 428/315.5 |

OTHER PUBLICATIONS

U.S. Ser. No. 07/808,787, R. Poirier, filed Dec. 16, 1991-allowed.

*Primary Examiner*—George F. Lesmes
*Assistant Examiner*—Blaine Copenheaver
*Attorney, Agent, or Firm*—A. J. McKillop; G. W. Hager; J. P. O'Sullivan

[57] ABSTRACT

A multilayer label stock structure comprising a label stock of polypropylene film having on one side thereof a highly printable blend of (A) alkylene acrylate copolymer and (B) an interpolymer of an alkyl acrylate, an alkyl methacrylate and an alkyl acrylate acid.

9 Claims, No Drawings

LABEL FACE STOCK

FIELD OF THE INVENTION

This invention relates to the field of adhesively adhered labels. In particular, the invention relates to biaxially oriented polymer film structures employed as adhesively adhered labels.

BACKGROUND OF THE INVENTION

Of recent years polymeric films have been utilized to take the place of paper for product labels and the like. Synthetic film labels are stronger and in some respects easier to handle in automatic machinery employed for applying labels to products.

A typical system employs a release layer which carries one or more removable labels therefrom. The label carried by the release substrate has a pressure sensitive adhesive on one side and a product identifying indicia or other information on the other. The release layer is composed of a substrate which has a surface to which the label adhesive will not aggressively adhere. The release characteristics of the substrate and the adhesive are such that when the substrate is bent through a certain angle, the stiffness of the label will cause it to separate from the release surface in spite of the presence of the adhesive. This will permit a container or product to be interfaced with the adhesive layer so that the label will transfer from the release surface to the product to be labeled. This technique happens rapidly and sequentially in automated mechanisms. One shortcoming in general with the use of polymeric films with label stock is that they may not have excellent printability with high speed dot matrix and thermal transfer printers. Thermoplastic label stock is also much desired in contrast to paper labels from the standpoint of recyclability. Paper labels intermixed with recyclable plastic film present a significant problem since the two materials are not easily separable. Thus, there is an ever increasing need for plastic film label stock as opposed to paper labels.

Therefore, it is an object of the present invention to present a synthetic film-adhesive label face stock having excellent printability.

SUMMARY OF THE INVENTION

The label stock of the present invention includes the following multilayer structure:

A base structure comprising an oriented polypropylene film having on one side thereof a blend of (A) one or more alkylene acrylate copolymer and (B) an interpolymer of (a) from 2.5 to about 6 parts by weight of an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methylacrylate, and from about 52.5% to about 69% by weight of methyl methacrylate when said alkyl acrylate is ethyl acrylate; said mixture containing inert inorganic fillers; and on the other side thereof an adhesive layer.

In many instances the adhesive will be a pressure sensitive adhesive. In other cases the adhesive may be one activatable by any means, such as, heat, solvent, etc. For its best utility the above described label structure is carried by a release surface wherein the release characteristics of the surface of the release sheet permits the label stock to be readily removed therefrom so as to be applied to some other surface.

DETAILED DESCRIPTION OF THE INVENTION

For use as a base or core layer for label stock purposes, this material can be transparent or opaque, preferably white opaque. For the opaque version, this provides an excellent contrasting background for printed material applied to the outer surface of the label stock. A material which has the good characteristics of excellent tensel strength, low permeability to moisture and other liquids, is oriented polypropylene. A preferred transparent polypropylene base or core layer has two or more coextruded polypropylene layers, one layer of which is thicker than the skin or outer layers. These outer layers may be filled or unfilled with appropriate additives. A preferred opaque base or core material is an oriented polypropylene structure containing a core layer cavitated in a special way so as to produce a pearlescent opaque appearance. A material of this type is described in U.S. Pat. No. 4,377,616 issued to Ashcraft et al. This patent is incorporated herein by reference in its entirety. In accordance with this patent, the process of preparing the opaque film structure is as follows: a major proportion of a first thermoplastic material, e.g. polypropylene, is mixed with a minor proportion of second material of a higher melting point or of a high glass transition temperature than the first material. This mixture is heated to a temperature at least above the melting point of the first material. Thereafter, the second material is uniformly dispersed throughout the molten first material in the form of microspheres. The microspheres can be conveniently prepared in a master batch of, e.g. polybutylene terephthalate, micro dispersed in molten form in molten polypropylene. This combination is then coextruded with clear unfilled polypropylene so as to have a thin skin layer on opposite surfaces of the core combination of the materials. Thereafter, this arrangement is biaxially oriented at a temperature and to a degree to form a strata of opacifying closed cell voids of dimensions X, Y and Z. Dimensions X & Y are major dimensions and dimension Z is a minor dimension at least generally corresponding to the diameter of the microspheres. In some cases, it may be advantageous to include inorganic filler materials therein for example, to promote the roughness of the surface of the skin. The material dispersed as microspheres throughout the molten core material can be polybutylene terephthalate, nylon, solid or hollow preformed glass spheres, metal beads or spheres, ceramic spheres, calcium carbonate, etc.

As indicated, the preferred core material is polypropylene, particularly preferred is an isotactic polypropylene containing at least 80% by weight of isotatic polypropylene. It is also preferred that the polypropylene have a melt flow index of about 2–10 g/10 min.

It is preferred that the average diameter of the void-initiating particles be from about 0.1 to about 10 microns. These particles may be of any desired smooth shape, although it is preferred that they be substantially spherical.

The skin material coextruded onto one surface of the base or core material to be cavitated, preferably is a medium density polyethylene. This is meant that the density of the polyethylene can be anywhere from about 0.926–0.945. A material of this type is described in U.S. Pat. No. 5,194,324 issued to Poirer. This patent is incorporated herein by reference in its entirety.

It is also contemplated that one side may carry the medium density polyethylene layer while the opposite surface may carry no skin layer or may have any one of a variety of other skin surfaces. For example, the opposite skin material can be noncavitated polypropylene, a copolymer of ethylene and propylene, where the proportion of ethylene is from 2–8%, a terpolymer of ethylene, propylene and butene-1, etc. This skin surface can be any material which will aggressively receive thereon a coating of a pressure sensitive adhesive. This aggression must be sufficient to maintain the adhesive in contact with the skin layer when separation occurs between the adhesive and a release surface carrying the same.

The essence of the present invention involves employing a particular polymeric blend which results in a layer having excellent receptivity to impact and thermal printing methods. The resulting surface can be printed with high speed equipment that is present in the industry, i.e., 400 lines per minute. The resulting coating has excellent ink adhesion and smear resistance both dry and in the presence of water. This ensures that bar coding is not jeopardized by ambient conditions.

This polymeric blend is a combination of a mixture of (A) and (B). (A) is one or more alkylene acrylate copolymer. These copolymers have an alkylene group having 2-6 carbon atoms and an alkyl ester group having from 1-8 carbon atoms. These compounds are disclosed, for example, in U.S. Pat. No. 3,845,163 incorporated herein in its entirety by reference. This type of polymer is prepared by copolymerizing an olefin, for example, ethylene or propylene, with one or more of the following monomers: a $C_1$-$C_8$ alkyl acrylate, for example, methacrylate, ethylacrylate, hexylacrylate and the like; a $C_1$-$C_8$ alkyl methacrylate, for example, methyl methacrylate, ethyl methacrylate, hexyl methacrylate and the like; and acrylic acid or methacrylic acid. Preferred are copolymers of ethylene with an alkyl ester of acrylic acid. In general, the acrylate content or methacrylate content of the copolymer may be from approximately 10 to approximately 30% by weight. The olefin content of the copolymer may be from approximately 70 to approximately 90% by weight. An example of the last-mentioned copolymer is an ethylene-ethylacrylate copolymer with a weight ratio of ethylene to ethylacrylate of approximately 4.1 to 1.

Commercially available material of this type includes ethylene-methyl acrylate copolymer identified as Chevron Chemical Company PE 2205, having a methylacrylate content of 20% by weight, and a melt flow index of 2.4 gm/10 min. (ASTM D-1238), ethylene-acrylate acid copolymer having an acrylic acid content of about 6.5% and a melt flow index of 9.0 gm/10 min., available as Dow Primacor 3340 grade; ethylene-acrylic acid copolymer available as Dow Primacor 1430; and ethylene acrylic acid copolymer available as Dow Primacor 5991. A particularly preferred copolymer is obtained as a water emulsion from Michelman, Incorporated and is a 25% solids dispersion of Dow Primacor 5980. This material consists of ethylene copolymerized with acrylic acid.

The (B) component of the blend is typified by an interpolymer of (a) from 2.5 to about 6 parts by weight of an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methylacrylate, and from about 52.5% to about 69% by weight of methyl methacrylate when said alkyl acrylate is ethyl acrylate; said mixture containing inert inorganic fillers; and on the other side thereof an adhesive layer. Material of this type is described in U.S. Pat. No. 3,753,769 the disclosure of which is incorporated in its entirety. A preferred material is that described in Example 1 of the '769 patent.

The polymeric blend of (A) and (B) is prepared as a water based coating formulated as a 20–40% solids dispersion, preferably 30% solids dispersion. The composition can include absorptive, opacifying or whitening inert particles, such as, absorptive silica, calcium carbonate, $TiO_2$, etc. A typical coating composition can include the following:

| COATING INGREDIENT | PERCENT DRY |
| --- | --- |
| (A) alkylene acrylate copolymer | 35–55% |
| (B) interpolymer | 4–10 |
| Silica | 20–40 |
| Calcium carbonate | 5–20 |

This coating composition is applied to the selected base or core material. For example, a product sold by Mobil Chemical Company and identified as 140LL302 LabelLyte ® can be employed. This product is a 3 mil, white opaque label product consisting of a cavitated homopolymer polypropylene core with skin layers on opposite surfaces. The layer which is coated with the polymer blend of the present invention is a medium density polyethylene with a titanium dioxide filler. The opposite skin layer is a homopolymer polypropylene with a calcium carbonate filler. The coating can be applied in a secondary coating process. This refers to a process by which the film is coated in a process separate from the process forming the base or core material. A polymer blend composition can be applied by rod coating technology or by reverse direct gravure techniques. The coating weight of the label stock material can range from approximately 1–5 grams, preferably 2 grams per MSI. The following example illustrates a coated label stock within the scope of the present invention.

EXAMPLE

A 3 mil thick three layer LabelLyte ® film as described above, was coated on the medium density polyethylene side with 2 grams per MSI of the following 30% solids water based composition: (A) Dow 5980-ethylene copolymerized with acrylic acid, % dry 45%; (B) the interpolymer of methyl acrylate, methyl methacrylate, and methacrylic acid, % dry 5%, silica 35% and calcium carbonate 15%.

This coating structure has been found to be excellently compatible with impact and thermal printing methods and can be printed at 400 lines per minute.

In the art of labeling, the label which is to be applied to a surface or a product is normally carried by a release sheet or surface. A common example of this type of label structure, familiar to most automobile owners, is the county or city registration sticker which must be applied to the windshield of a car. This type of structure comprises a release sheet, one side of which has a release surface of a silicon material or the like. Carried on this surface is a pressure sensitive adhesive and applied to the pressure sensitive adhesive is the label or decal to be applied to the windshield. The adhesive may be applied either to the label or the release liner. When the decal or label is separated from the release sheet the pressure sensitive adhesive preferentially adheres to the label or decal and by this means is affixed to the windshield of the car. For the labeling of cans or bottles, obviously a more automated system must be employed. Providing for a more or less continuous labeling system, a continuous release roll is prepared by applying to one side of a continuous substrate which is preferably a polymeric film and still more preferably a polypropylene film and which may be of a single or multiple layers, a release coating of silicon or the like. Thereafter, for example, the release face of the release liner of the type described above is coated with a layer of pressure sensitive adhesive. Thereafter, a label stock as described above which has been or will be printed with the appropriate label indicia, is brought into mating contact with the pressure sensitive adhesive. Following this mating, printing can be accomplished, if not already completed and individual labels can be die-cut severed in a manner well known to the art. Following this procedure, labels then can be sequentially, individually applied to a product surface by causing the individual labels to separate from the release surface and having the adhesive side of the label contact and product to be labeled.

As indicated above, instead of a pressure sensitive adhesive, activatable adhesives can be employed for certain labeling techniques. For instance, when a label is to be applied about the full circumference of a package or bottle, a water or other solvent can activate an adhesive stripe or strip applied to one end of the label. The label is then fixed in place by a slight overlap of the other end of the label.

It should be evident that this disclosure is by way of example and that various changes may be made by adding modifying or eliminating details without departing from the fair scope of the teaching contained in this disclosure. The invention is, therefore, not limited to particular details of this disclosure except to the extent that the following claims are necessarily so limited.

What is claimed is:

1. A multilayer label film comprising a base structure comprising an oriented polypropylene film having on one side thereof a blend of (A) one or more alkylene acrylate copolymer of a $C_{2-6}$ monoolefin and a $C_{1-8}$ alkyl (meth) acrylate, and (B) and interpolymer of (a) from 2.5 to about 6 parts by weight of an alpha-beta monoethylenically unsaturated carboxylic acid selected from the group consisting of acrylic acid, methacrylic acid and mixtures thereof and (b) from about 97.5 to about 94 parts by weight of neutral monomer ester, said neutral monomer esters comprising (1) methyl acrylate or ethyl acrylate and (2) methyl methacrylate, said interpolymer comprising from about 30% to about 55% by weight of methyl methacrylate when the acrylate is methyl acrylate, and from about 52.5% to 69% by weight of methyl methacrylate when the acrylate is ethyl acrylate; said mixture containing inert inorganic fillers; and on the other side thereof an adhesive layer.

2. The label film of claim 1 wherein said base structure is transparent or opaque.

3. The film of claim 2 wherein said base structure is a multilayer coextruded structure.

4. The film of claim 3 wherein said structure has a comparatively thick layer and a comparatively thin skin layer on at least one side thereof.

5. The film of claim 4 wherein said structure is an opaque structure having a cavitated core layer with comparatively thin skin layers on opposite sides thereof.

6. The film of claim 5 wherein said skin layers contain inorganic filler material.

7. The film of claim 6 wherein one skin layer is of a medium density polyethylene containing an inorganic filler and this skin layer has the blend of (A) and (B) applied thereto; and the other skin layer is polypropylene with an inorganic filler therein.

8. The film of claim 7 wherein said alkylene acrylate copolymer (a) is a member selected from the group consisting of ethylene acrylic acid, ethylene methylacrylate, ethylene-ethylacrylate, ethylene butylacrylate, ethylene propylacrylate and mixtures thereof.

9. The film of claim 8 wherein said blend ranges from 70–95% by weight of (A) to from 5–30% by weight of (B) and said blend contains from 30–60% by weight of said inert fillers.

* * * * *